United States Patent [19]

Nakamura et al.

[11] Patent Number: 5,135,688
[45] Date of Patent: Aug. 4, 1992

[54] FUZZY INFERENCE THERMOCONTROL METHOD FOR AN INJECTION MOLDING MACHINE WITH A PLURALITY OF MEANS FOR HEATING OR COOLING

[75] Inventors: Nobuyuki Nakamura; Kiyoto Takizawa; Masashi Suganuma, all of Sakaki, Japan

[73] Assignee: Nissei Jushi Kogyo Kabushiki Kaisha, Nagano, Japan

[21] Appl. No.: 769,786

[22] Filed: Oct. 2, 1991

[30] Foreign Application Priority Data

Oct. 18, 1990 [JP] Japan .................... 2-279623

[51] Int. Cl.$^5$ .................................. B29C 45/78
[52] U.S. Cl. .................. 264/40.6; 264/328.14; 425/144; 364/476; 395/900
[58] Field of Search ............ 264/40.1, 40.3, 40.4, 264/40.5, 40.6, 328.14, 328.15, 328.16; 425/135, 140, 141, 143, 144, 145, 149, 161, 162, 169, 170, 173, 542; 395/900; 364/476

[56] References Cited

U.S. PATENT DOCUMENTS

| | | | |
|---|---|---|---|
| 3,822,867 | 7/1974 | Evans | 425/144 |
| 4,094,940 | 6/1978 | Hold | 264/40.6 |
| 4,707,310 | 11/1987 | Debeaud | 264/328.14 |
| 4,841,459 | 6/1989 | Ikeda et al. | 364/476 |
| 4,899,288 | 2/1990 | Tsutsumi | 364/476 |
| 4,911,629 | 3/1990 | Fujita | 264/40.6 |
| 5,012,430 | 4/1991 | Sakurai | 395/900 |

FOREIGN PATENT DOCUMENTS 63-48691 9/1988 Japan.

OTHER PUBLICATIONS

Maiers and Sherif, IEEE Transactions on System, vol. SMC-15, No. 1 "Applications of Fuzzy Set Theory", Jan./Feb. 1985, pp. 175-189.

McCusker Tom, Control Engineering, "Neural Networks and Fuzzy Logic, Tools of Promise for Controls", May 1990, pp. 84,85.

Primary Examiner—Jill L. Heitbrink

[57] ABSTRACT

To eliminate a temperature overshoot or an undershoot during thermocontrol of thermocontrolled components, e.g. an injection cylinder, with respect to an object temperature in each operating status of the injection molding machine, the Fuzzy Control theory is used for controlling the injection molding machine. By using the Fuzzy Control theory, the object temperature of the thermocontrolled components can be attained with practically eliminated overshoot and undershoot.

9 Claims, 5 Drawing Sheets (A) STATUS OF THE INJECTION MOLDING MACHINE (B) FIRST DEVIATION $\triangle T_2$ (C) RATE OF DEVIATION CHANGE $\triangle(\triangle T)_2$ (D) SECOND DEVIATION $\triangle T_{12}$ (E) CONTROL VOLTAGE (SECOND HEATER)

FUZZY INFERENCE THERMOCONTROL METHOD FOR AN INJECTION MOLDING MACHINE WITH A PLURALITY OF MEANS FOR HEATING OR COOLING

BACKGROUND OF THE INVENTION

The present invention relates to a thermocontrol method for an injection molding machine, more precisely relates to a method for controlling temperature of thermocontrolled components, e.g. an injection cylinder, of the injection molding machine having means for heating and/or cooling, which are arranged at the prescribed intervals, to correspond to the instant operating status thereof.

Conventionally, the PID (Proportional band-Integral time-Differential time) control method is usually adopted to control the temperature of thermocontrolled components, e.g. an injection cylinder, of an injection molding machine.

The PID control method is based on a proportional action (P), which is in proportion to a control deviation; an integral action (I), which is based on an integrated value of the control deviation; and a differential action (D), which is based on differential coefficients of the thermocontrolled components. Using the PID control method, the object temperature can be maintained when the thermocontrolled components are under certain stable conditions.

However, the injection molding machine has various operating states such as stop, temperature rise, mold, pause, etc. Furthermore, heating elements and cooling elements are different devices in each status. For example, in the temperature rise state, the heat of the heaters is the main heating element; radiant heat is the main cooling element. On the other hand, heat from the heater, the heat of friction caused by an injection screw acting upon the resin, etc. are the heating elements in the mold status, while the natural radiant heat, the endothermic reaction by resin supplied, etc. are the cooling elements therein.

The interior temperature of injection cylinders is controlled to maintain a prescribed temperature distribution so as to inject resins smoothly. Generally, a plurality of heaters are arranged in the axial direction of the injection cylinder at prescribed intervals. Heat of each thermocontrolled component, which is conducted via separating parts between adjacent thermocontrolled components, affects the temperature of adjacent thermocontrolled components.

In the conventional PID control of the injection cylinder, the heating elements and the cooling elements are different in each status. The temperature of each thermocontrolled component of the injection cylinder is shown in FIG. 7.

FIG. 7 shows temperature change of each thermocontrolled component of the injection cylinder in the status of temperature rise, wherein the injection cylinder has three heaters which are serially provided between an injection nozzle and a hopper.

In the injection cylinder, the relationship among the object temperature $T01$ of a first thermocontrolled component whose temperature is controlled by a first heater H1 provided on the injection nozzle side; object temperature $T03$ of a third thermocontrolled component whose temperature is controlled by a third heater H3 provided on the hopper side; and object temperature $T02$ of a second thermocontrolled component whose temperature is controlled by a second heater H2 provided between the first heater H1 and the third heater H3 is:

$$T01 > T02 > T03$$

The temperature of an injection cylinder, for example, may be higher (overshoot, $P_o$) or may be lower (undershoot, $P_u$) than the object temperature, as shown in FIG. 7: A Temperature Graph of the Injection Cylinder.

Moreover, the second thermocontrolled component, which is controlled by the second heater H2, is affected by heat conducted from the first heater H1 and the third heater H3, so that the overshoot $P_o$ and the undershoot $P_u$ in the graph T2 of the second thermocontrolled component is greater than that of the other graphs T1 and T3.

The overshoot $P_o$ and undershoot $P_u$ of the injection cylinder have a large effect on the viscosity of molten resin, so that they may become factors in inferior production quality.

Moreover, the overshoot $P_o$ causes resin deterioration when the object temperature is exceeded and the resin deterioration temperature is attained, resulting in inferior products. To avoid inferior production quality, manual control of the temperature of the injection cylinder, based on the experience of a skilled operator, is required.

SUMMARY OF THE INVENTION

An object of the present invention is to provide a thermocontrol method for an injection molding machine, which is capable of eliminating as much as possible the overshoot and the undershoot with respect to the object temperature of thermocontrolled components arranged at prescribed intervals, e.g. the injection cylinder, and which is capable of automatically controlling the temperature of the thermocontrolled components.

To achieve the object, the inventor first tried the method disclosed in the Japanese Patent Publication Gazette No. 63-48591. The method consists of designing an estimated heat conduction model of thermocontrolled components, and performing thermocontrol in accordance with the heat conduction model.

When the actual heat conduction is similar to the model, this method is capable of reducing the overshoot and the undershoot. However, significant overshoot or undershoot may occur when the actual heat conduction varies from the model.

The inventor then determined that the Fuzzy Control theory would prove effective for controlling the temperature of the thermocontrolled components, e.g. the injection cylinder, and thus created the present invention.

Namely, the thermocontrol method for an injection molding machine having a plurality of means for heating and/or cooling, which are arranged at prescribed intervals, so as to control thermocontrolled components to maintain an object temperature corresponding to an operating status of the injection molding machine comprises the steps of:

detecting the operating status of the injection molding machine and the temperature of the thermocontrolled components thereof;

calculating a first deviation between the object temperature of the thermocontrolled components corresponding to the present status of the injection molding machine and the present temperature detected, and the rate of deviation change between the present first deviation and the previous first deviation;

calculating a second deviation between an object temperature of separating parts, which are parts between the thermocontrolled components, and the present temperature thereof;

performing fuzzy inference to define a control value for the means for heating or cooling by inferring the status of the injection molding machine, the first deviation calculated, the rate of deviation change and the second deviation wherein the status of the injection molding machine, the first deviation, the rate of deviation change, the second deviation and the control value of the means for heating or cooling are defined as fuzzy variables, and wherein the inference is based both on rules governing a mutual relationship among groups within membership functions, and membership functions which have groups to which are previously assigned optional probabilities which correspond to respective optional values; and calculating an actual control value of the means for heating and/or cooling based on the fuzzy inference.

In the present invention, the Fuzzy Control theory is used for controlling the temperatures of the thermocontrolled components, whose temperatures are mutually effected by heat conduction via the separating parts, so that changing the control value of the means for heating and/or cooling, which are assembled in the injection cylinder, molds, etc. can be automatically executed as if by a skilled operator.

By utilizing the Fuzzy Control theory, the actual temperature of the thermocontrolled components can quickly reach the object temperature, during which period temperature overshoot and undershoot can be eliminated as much as possible.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF PREFERRED EMBODIMENT

Preferred embodiments of the present invention will now be described in detail with reference to the accompanying drawings.

Figure 1:
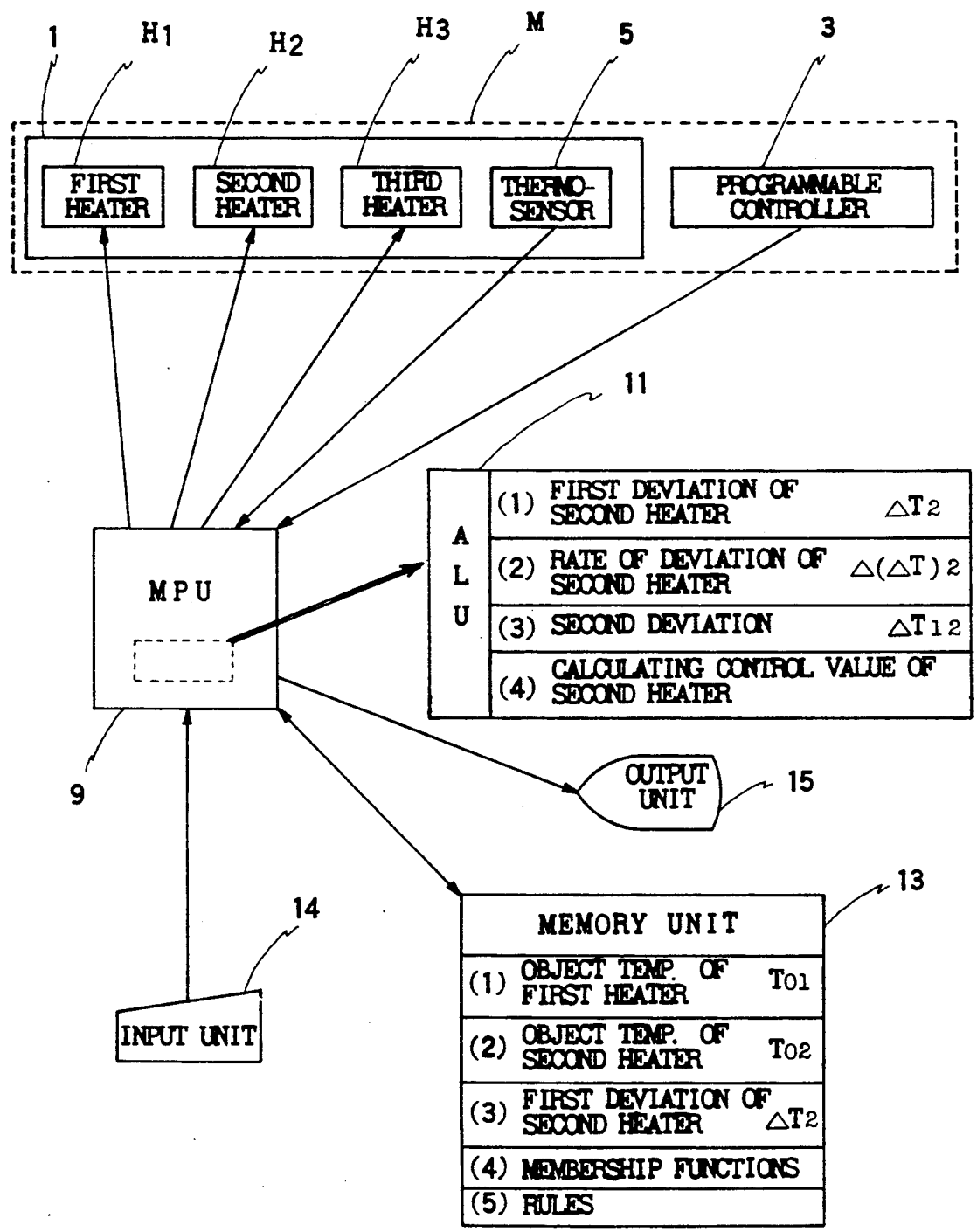
FIG. 1 is a block diagram showing an embodiment of the present invention.
Figure 2A:
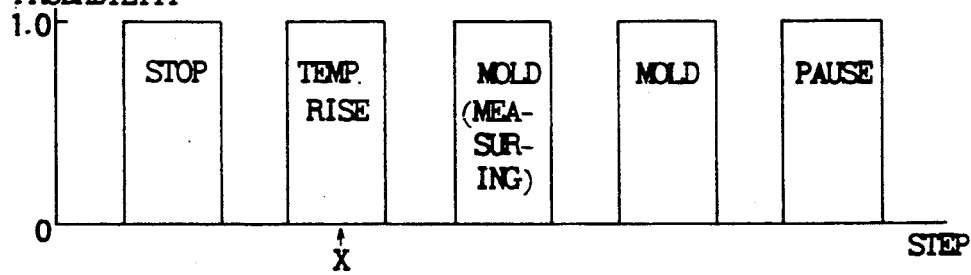
FIG. 2 is an explanatory view showing membership functions.
Figure 2B:
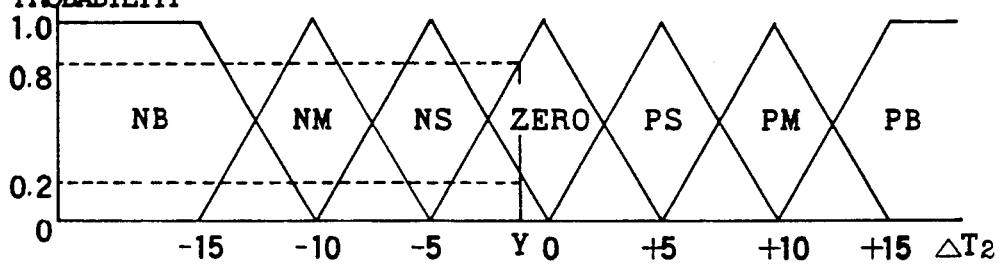
Figure 2C:
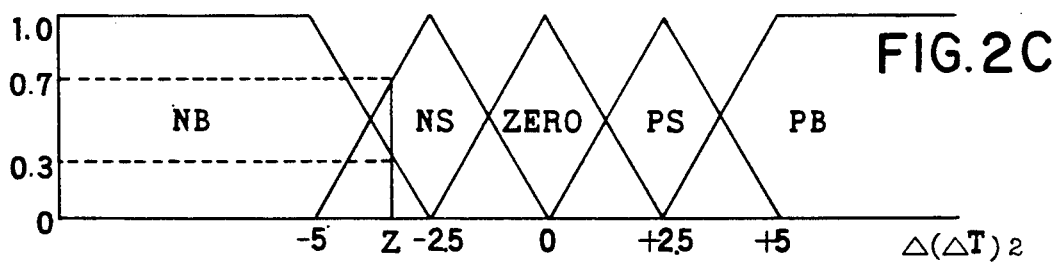
Figure 2D:
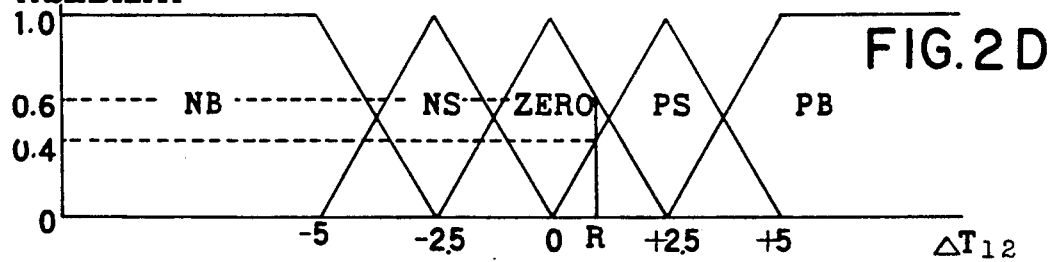
Figure 2E:
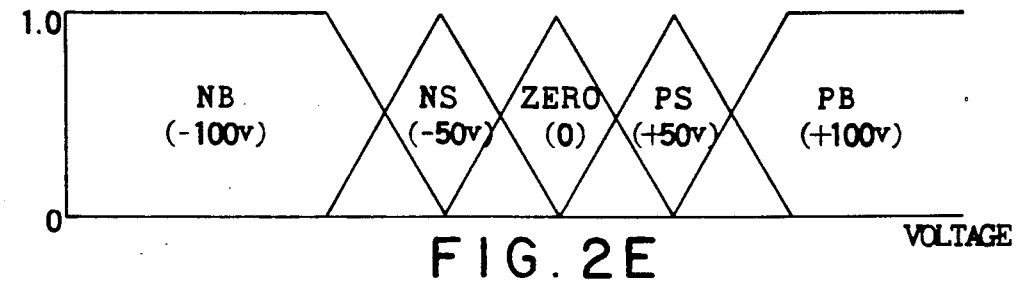

FIG. 1 is a block diagram showing the present embodiment.

In FIG. 1, an injection molding machine M has an injection cylinder 1, which is divided into three thermocontrolled components: a first thermocontrolled component, a second thermocontrolled component and a third thermocontrolled component positioned at intervals between an injection nozzle side and a hopper side. Each thermocontrolled component has a thermosensor 5 for detecting the temperature of the thermocontrolled component.

A first thermocontrolled component, located on the injection nozzle side, has a first electric heater H1; a third thermocontrolled component, located on the hopper side, has a third electric heater H3; and a second thermocontrolled component, located between the first thermocontrolled component and the third thermocontrolled component, has a second electric heater H2.

The relationship of the object temperatures T01, T02 and T03 of the first, second and third thermocontrolled components is:

$$T01 > T02 > T03.$$

Conventional thermosensors and conventional electric heaters may be used as the thermosensors 5 and the heaters H1–H3.

Note that, the injection cylinder 1 excludes a nozzle portion, which comes into contact with molds.

As an example, the thermocontrol of the second thermocontrolled component of the injection cylinder 1 will be explained.

Figure 7:
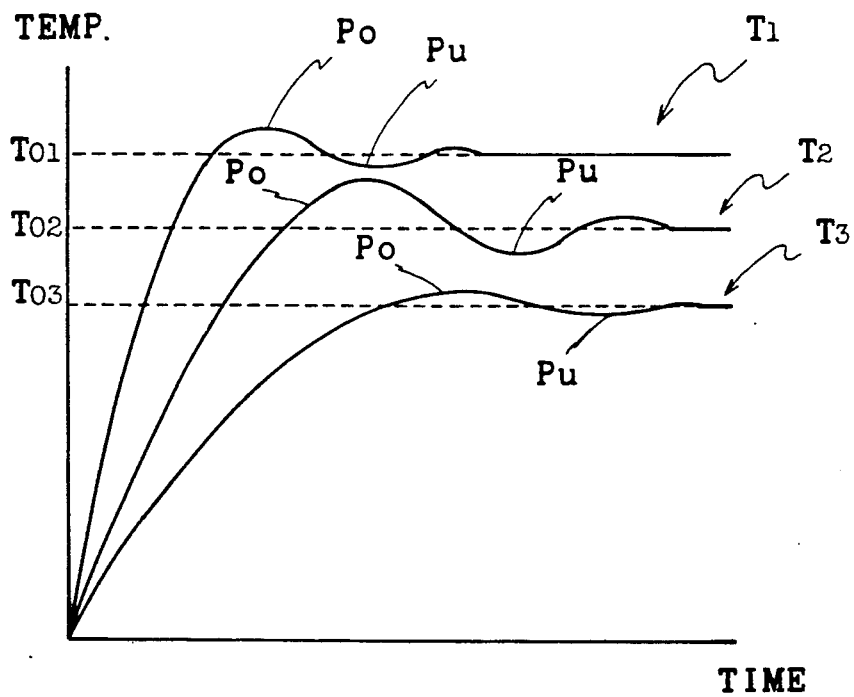
FIG. 7 is a temperature graph of an injection cylinder.

The temperature of the second thermocontrolled component is affected by the heat of the adjacent first and third thermocontrolled components, so that its overshoot and undershoot may be greater than that of the first and the third thermocontrolled components as shown in FIG. 7.

The injection molding machine M is controlled by a programmable controller 3, and the states of the injection molding machine M such as temperature rise, mold, pause, etc. are known from the controller 3.

Signals from the controller 3 are sent to a microprocessor (MPU)) 9 to indicate the present operating status of the injection molding machine M: temperature rise, mold, pause, etc.

The object temperature T01 and T03 of the first and the third thermocontrolled components corresponding to the present operating status of the injection molding machine M, is defined on the basis of temperature data stored in areas (1) and (2) of a computer memory 13.

The present temperature T2 of the second thermocontrolled component, detected by the sensor 5, and the object temperature T02, defined on the basis of signal of the controller 3, are sent to the MPU 9. A first deviation $\Delta T2$ ($\Delta T2 = T2 - T02$) is calculated by an arithmetic logical unit (ALU) 11 of the MPU 9, written in an area (3) of the memory 13.

Furthermore, the ALU 11 calculates the rate of deviation change $\Delta(\Delta T)2$ of the present first deviation $\Delta T2$ and the previous first deviation $\Delta T2'$ stored in the area (3) of the memory 13 ($\Delta(\Delta T)2 = \Delta T2 - \Delta T2'$).

In the present embodiment, the ALU 11 calculates the second temperature deviation $\Delta T12$, which is the deviation between the object temperature and the present temperature of the separating part located between the first and the second thermocontrolled components.

The second temperature deviation ΔT12 is calculated as follows:

$$\Delta T12 = [(T1+T2)-(T01+T02)]/2$$

wherein
- T1: detected temperature of the first thermocontrolled component,
- T2: detected temperature of the second thermocontrolled component,
- T01: object temperature of the first thermocontrolled component,
- T02: object temperature of the second thermocontrolled component.

The separating part between the first and the second thermocontrolled parts is usually narrow, and the temperature deviation therebetween is about 10° C., so that the temperature deviation between the calculated temperature of the separating part, which is calculated on the basis of the detected temperature T1 and T2, and the detected temperature thereof is very small.

Fuzzy inference is performed on the basis of the membership functions and the rules which are stored in the areas (4) and (5) of the memory 13, using the status of the injection cylinder 1, the first deviation ΔT2, the rate of the deviation change Δ(ΔT)2 and the second deviation ΔT12, which are each detected or calculated.

Then, the control value for the second heater H2 is calculated on the basis of fuzzy inference by the ALU 11. The calculated control value is sent to the second heater H2 as a control signal by the MPU 9. The above stated sequence, from reading data to sending control signals to the second heater H2, will be continuously repeated, so that the actual temperature of the second thermocontrolled component can quickly reach the object temperature T02, which corresponds to the present status of the injection molding machine M. Note that, the contents of the memory 13 can be shown on an output unit 15, e.g. a display, and can be changed with an input unit 14, e.g. a keyboard.

The membership functions for each fuzzy variable have been stored in an area (4) of the memory 13 (see FIG. 2). The fuzzy variables are: the value (A) indicating the status of the injection molding machine; the first deviation ΔT2 (B) of the second thermocontrolled component; the rate of deviation change Δ(ΔT)2 (C) of the second thermocontrolled component; the second temperature deviation ΔT12 between the first and the second thermocontrolled components; and the degree of output for operation (E), i.e. control voltage of the second heater H2.

Each membership function is divided into a plurality of groups including or excluding mutual overlapped sectors. Each group has been respectively assigned a grade or a probability (0-1).

The membership function for the fuzzy variable (A) is divided into five distinct groups. The grades of the groups are "0" or "1". The membership function for the fuzzy variable (B), which is the first deviation ΔT2, is divided into seven groups with overlapped sectors. Five groups of the seven are graphically depicted as triangles. In the graph, temperature change is indicated along the horizontal axis—the base edge of the overlapping triangular groups—and is defined in 10° C. increments which correspond to the length of each triangular group's base edge.

Each membership function for the fuzzy variable (C), which is the rate of the first deviation change Δ(ΔT)2 and the second deviation ΔT12, is divided into five groups with overlapped sectors. Three groups of the five are also graphically depicted as triangles. In the triangular groups, the rate of deviation change or the second deviation at the base edge is defined in 5° C. increments which correspond to the length of each triangular group's base edge.

The second heater H2, whose rated voltage is 200 V, is controlled by inputting 100 V plus or minus the control voltage. Thus, the membership function whose fuzzy variable is the degree of output for operation (E), i.e. the control voltage of the second heater H2, is graphically divided into five overlapping sectors whose points of intersection delineate 50 V increments. Three groups of the five are graphically shown as triangles.

The relationship among the groups of each membership function is defined by a rule previously stored in an area (5) of the memory 13. A rule for temperature rise status, as an example, is shown in the following TABLE:

TABLE

| No. | if INPUT | | | | then OUTPUT |
| --- | --- | --- | --- | --- | --- |
|  | A | B | C | D | E |
| 1 | TEMP. RISE | NB | NB | — | PB |
| 2 | TEMP. RISE | NB | NS | — | PB |
| 3 | TEMP. RISE | NB | ZERO | — | PB |
| 4 | TEMP. RISE | NB | PS | — | PB |
| 5 | TEMP. RISE | NB | PB | — | PB |
| 6 | TEMP. RISE | NM | NB | — | PB |
| 7 | TEMP. RISE | NM | NS | — | PB |
| 8 | TEMP. RISE | NM | ZERO | — | PB |
| 9 | TEMP. RISE | NM | PS | — | PS |
| 10 | TEMP. RISE | NM | PB | — | PS |
| 11 | TEMP. RISE | NS | NB | — | PB |
| 12 | TEMP. RISE | NS | NS | — | PS |
| 13 | TEMP. RISE | NS | ZERO | — | PS |
| 14 | TEMP. RISE | NS | ZERO | PB | NS |
| 15 | TEMP. RISE | NS | ZERO | ZERO | PS |
| 16 | TEMP. RISE | NS | ZERO | NB | PB |
| 17 | TEMP. RISE | NS | PS | — | ZERO |
| 18 | TEMP. RISE | NS | PB | — | ZERO |
| 19 | TEMP. RISE | ZERO | PS | — | PS |
| 20 | TEMP. RISE | ZERO | PB | — | PS |
| 21 | TEMP. RISE | ZERO | NB | PS | ZERO |
| 22 | TEMP. RISE | ZERO | NS | — | ZERO |
| 23 | TEMP. RISE | ZERO | PS | — | NS |
| 24 | TEMP. RISE | ZERO | PS | PS | NS |
| 25 | TEMP. RISE | ZERO | PB | — | NS |
| 26 | TEMP. RISE | PS | NB | — | PS |
| 27 | TEMP. RISE | PS | NS | — | ZERO |
| 28 | TEMP. RISE | PS | NS | ZERO | PS |
| 29 | TEMP. RISE | PS | NS | PS | ZERO |
| 30 | TEMP. RISE | PS | ZERO | — | ZERO |
| 31 | TEMP. RISE | PS | ZERO | PS | NS |
| 32 | TEMP. RISE | PS | PS | — | NS |
| 33 | TEMP. RISE | PS | PB | — | NB |
| 34 | TEMP. RISE | PM | NB | — | NS |
| 35 | TEMP. RISE | PM | NS | — | NS |
| 36 | TEMP. RISE | PM | ZERO | — | NB |
| 37 | TEMP. RISE | PM | PS | — | NB |
| 38 | TEMP. RISE | PM | PB | — | NB |
| 39 | TEMP. RISE | PB | NB | — | NB |
| 40 | TEMP. RISE | PB | NS | — | NB |
| 41 | TEMP. RISE | PB | ZERO | — | NB |
| 42 | TEMP. RISE | PB | PS | — | NB |
| 43 | TEMP. RISE | PB | PB | — | NB |

In the TABLE, the INPUTs A, B, C and D in the "if" column respectively indicate the fuzzy variables: the status of the injection molding machine M (A); the first deviation ΔT2 (B); the rate of deviation change Δ(ΔT)2 (C); and the second deviation ΔT12.

On the other hand, the OUTPUT E in the "then" column indicates the control value of the second heater H2 (E).

In the horizontal direction of the TABLE, for example in row No. 1, the relationship among the INPUTs A, B, C and D is logical "AND"; in the vertical direction thereof, for example, the relationship between row No. 1 and row No. 2 is logical "OR". Note that, there are shown in the TABLE all combinations of all the groups in the membership function for the INPUTs A, B, C and D, but combinations impossible or very rare may be omitted from the TABLE.

Next, the fuzzy inference for defining the input value or the input voltage to the heaters will be explained. Note that, this case will be explained under the following conditions: the variable (A), Operating Status, is X (temperature rise); the variable (B), Latest First Temperature Deviation $\Delta T2$, is Y; the variable (C), Latest Rate of Deviation Change $\Delta(\Delta T)2$ is Z; and the second deviation $\Delta T12$ is R.

Figure 3:
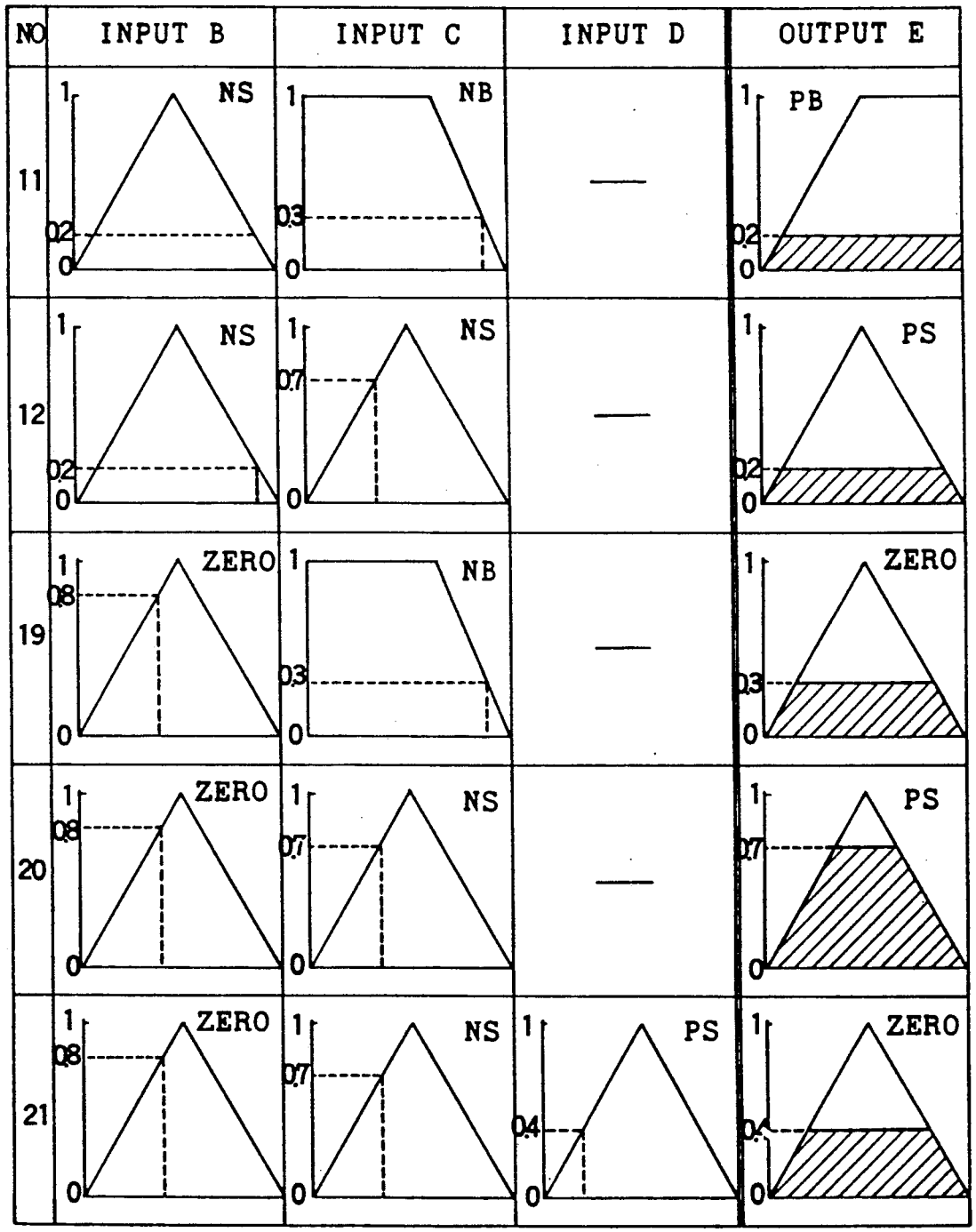
FIG. 3 is an explanatory view showing examples of Fuzzy inference.

In the position Y of the variable (B) or the first deviation $\Delta T2$, the groups "ZERO" and "NS" are overlapped; in the position Z of the variable (C) or the rate of the deviation change $\Delta(\Delta T)2$, the groups "NS" and "NB" are overlapped; and in the position R of the second deviation $\Delta T12$, the groups "ZERO" and "PS" are overlapped. Therefore, combinations of the INPUTs A, B, C and D result in five rules, which are shown in FIG. 3 as rules Nos. 11, 12, 19, 20 and 21. In the rules No. 11, 12, 19 and 20, the OUTPUT E is defined by the INPUTs A, B, and C; in the rule No. 21, the OUTPUT E is defined by the INPUTs A, B, C and D. The relationship among the INPUTs A, B, C and D in each rule is logical "AND", so that OUTPUT E for each combination will infer a range including the INPUTs A, B, C and D. Namely, the range of the OUTPUT E is shown as an area which is partitioned by minimum input values of the INPUTs A, B, C and D, marked by the shaded area in FIG. 3.

The actual control voltage to the second heater H2 is calculated by the ALU 11 on the basis of the inferred OUTPUTs E of the rules.

The steps of the calculation will be explained.

The mutual relationship among OUTPUTs E is logical "OR". First, the inferred range (marked by shading in FIG. 3) of each OUTPUT E, is composed as shown in FIG. 4.

Figure 4:
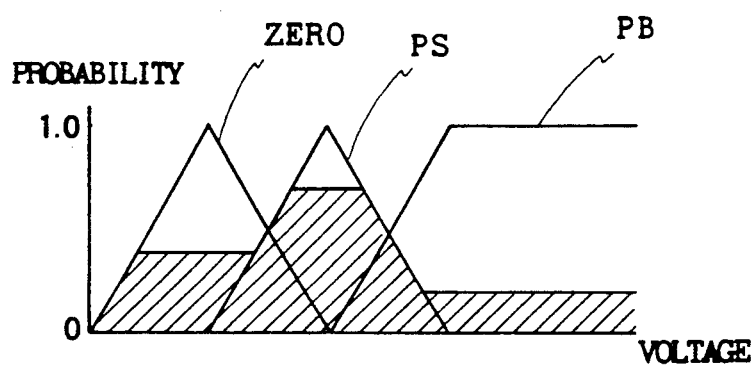
FIG. 4 is an explanatory view showing the steps of calculating control values.

Next, the centroid of the inferred range in FIG. 4 is determined and the control value, corresponding to the input voltage for the second heater H2, is calculated. The control value calculated by the ALU 11 is sent to the second heater H2 and the control voltage thereto is controlled by the MPU 9.

Furthermore, the control value for the first heater H1 and the third heater H3 will be determined in the same manner and controlled by the MPU 9.

Figure 5:
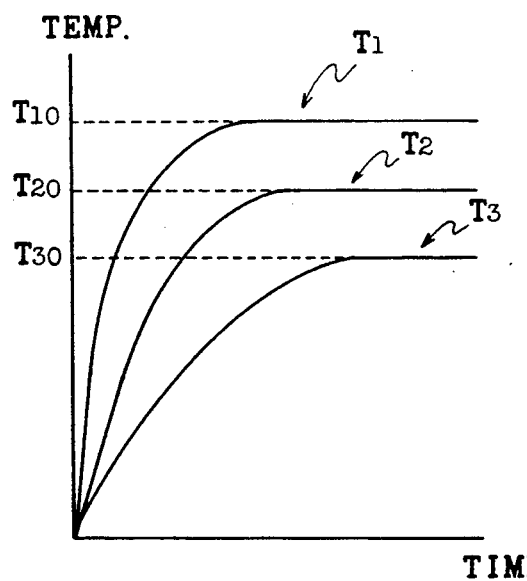
FIG. 5 is an explanatory view showing each control status or the thermocontrolled component.

Utilizing the above described Fuzzy Control theory, temperature overshoot $P_o$ and undershoot $P_u$ (see the graph F in FIG. 5) in the injection cylinder 1 can be virtually eliminated, and the temperature of the injection cylinder 1 is automatically adjusted to correspond to the object temperature of the instant operating state of the injection molding machine M. Furthermore, inferior production can be prevented. Even in cases of using a resin with low thermostability, no manual control by experienced operators is required.

Note that, in the present embodiment, new membership functions, e.g. a deviation between the current rate of change and previous rate thereof, may be added to the membership functions shown in FIG. 2.

Figure 6:
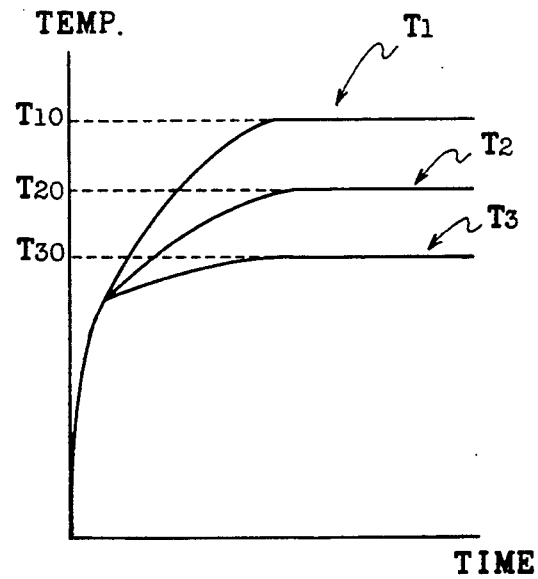
FIG. 6 is an explanatory view showing each control status of the thermocontrolled component.

Additionally, each thermocontrolled component may be controlled respectively after all the thermocontrolled components are heated together to prescribed temperatures as shown in FIG. 6.

In the present embodiment, an injection nozzle, which may be provided to the front end of the injection cylinder, may also be controlled utilizing the Fuzzy Control theory as applied to the injection cylinder.

Furthermore, the temperatures of the molds also need precise control, so they too may be controlled on the basis of the fuzzy inference.

There are provided means for heating, e.g. an electric heater, and means for cooling, e.g. a water circulation pipe, in some molds. In this case, the means for heating and cooling may be controlled on the basis of the fuzzy theory, so that the overshoot and the undershoot can be eliminated as much as possible. Thus, an unskilled operator using a preprogrammed Fuzzy Control system is capable of controlling the temperature of the molds as if he were a skilled operator applying manual control.

In the present invention, the temperature of the thermocontrolled components, which mutually affect one another, is capable of automatically adjusting to the object temperature corresponding to the operating status of the injection molding machine. During the afore described automated thermocontrol, overshoot and undershoot are eliminated as much as possible. Therefore, the present invention contributes to the effective operation of injection molding machines and to the reduction of inferior molded products.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A thermocontrol method for an injection molding machine having a plurality of means for heating or cooling, which are arranged at prescribed intervals, so as to control thermocontrolled components to maintain an object temperature corresponding to an operating status of the injection molding machine, comprising the steps of:

detecting the operating status of the injection molding machine and the temperature of the thermocontrolled components thereof;

calculating a first deviation between the object temperature of the thermocontrolled components corresponding to the present status of the injection molding machine and the present temperature detected, and the rate of deviation change between the present first deviation and the previous first deviation;

calculating a second deviation between an object temperature of separating parts, which are parts between the thermocontrolled components, and the present temperature thereof;

performing fuzzy inference to define a control value for the means for heating or cooling by inferring the status of the injection molding machine, the first deviation calculated, the rate of deviation change and the second deviation wherein the status of the injection molding machine, the first deviation, the rate of deviation change, the second deviation and the control value of the means for heating or cooling are defined as fuzzy variables, and wherein the inference is based both on rules governing a mutual relationship among groups within membership functions, and membership functions which have groups to which are previously assigned optional probabilities which correspond to respective optional values;

calculating an actual control value of the means for heating or cooling based on the fuzzy inference and controlling the temperature of the plurality of means for heating or cooling with the actual control value.

2. The thermocontrol method for an injection molding machine according to claim 1,
wherein the thermocontrolled components are an injection cylinder or molds.

3. The thermocontrol method for an injection molding machine according to claim 2,
wherein the injection cylinder includes an injection nozzle provided to an end thereof.

4. The thermocontrol method for an injection molding machine according to claim 1,
wherein each membership function is divided into a plurality of groups which have mutually overlapping sectors when the membership functions are graphically depicted.

5. The thermocontrol method for an injection molding machine according to claim 4,
wherein the overlapped sectors are triangular when graphically depicted.

6. The thermocontrol method for an injection molding machine according to claim 1,
wherein the status of the injection molding machine is controlled by a programmable controller.

7. The thermocontrol method for an injection molding machine according to claim 1,
wherein the means for heating is an electric heater.

8. The thermocontrol method for an injection molding machine according to claim 1,
wherein the means for cooling is a water circulation pipe.

9. The thermocontrol method for an injection molding machine according to claim 1,
wherein the membership functions and the rules are previously stored in a memory unit of a computer.

* * * * *